Nov. 12, 1935. J. O. JOHNSON Re. 19,754

SNOWPLOW WITH SIDE CHUTES

Original Filed Nov. 19, 1928 3 Sheets-Sheet 1

Inventor
John O. Johnson
By his Attorneys
Williams, Pierce & Williams

Nov. 12, 1935. J. O. JOHNSON Re. 19,754

SNOWPLOW WITH SIDE CHUTES

Original Filed Nov. 19, 1928 3 Sheets-Sheet 2

Inventor
John O. Johnson
By his Attorneys
Williamson, Reif & Williamson

Nov. 12, 1935. J. O. JOHNSON Re. 19,754

SNOWPLOW WITH SIDE CHUTES

Original Filed Nov. 19, 1928 3 Sheets-Sheet 3

Inventor
John O. Johnson
By his Attorneys
Williamson Perf
& Williamson

Reissued Nov. 12, 1935 Re. 19,754

UNITED STATES PATENT OFFICE 19,754

SNOWPLOW WITH SIDE CHUTES

John O. Johnson, Minneapolis, Minn., assignor to Enterprise Holding Company, Minneapolis, Minn., a corporation of Minnesota Original No. 1,816,589, dated July 28, 1931, Serial No. 320,352, November 19, 1928. Application for reissue February 15, 1932, Serial No. 593,187

10 Claims. (Cl. 37—43)

This invention relates to a snow plow, and particularly to a plow adapted to clear highways of snow. As is well known, there are now an immense number of improved and paved highways and it is rapidly becoming the practice to keep these highways open all winter, even in sections where there is a large amount of snow. It is desirable to have a plow which can clear the snow from the highway no matter what the size of the drifts, and one which will discharge the snow clear of the highway. Where the drifts are very deep and a snow plow cuts through, the snow tends to drop down from the top and sides of the drift and form a talus or bank of snow which narrows and obstructs the road. This result will occur more commonly where the snow is not thrown far enough to one side or is not projected over the top of the drift. It is an object of this invention, therefore, to provide a snow plow having means for moving the snow laterally and discharging the same at a considerable height so that it will be discharged over the side of the drift or snow bank.

It is a further object of the invention to provide a snow plow having means for moving the snow to one side and discharging the same at some height, together with means for directing the discharged snow laterally.

It is also an object of this invention to provide a snow plow comprising a prow portion, a mold board extending laterally from said prow portion, said mold board having a blade or knife at its outer end disposed in a substantially vertical plane, together with discharge means for the snow disposed inwardly of said knife.

It is still another object of this invention to provide a snow plow as set forth in the preceding paragraph, in which the outer end of the mold board is partially closed and has upwardly extending means through which the snow is discharged by said discharge means.

It is also an object of this invention to provide a snow plow having a prow portion, a laterally inclined and concave mold board extending from said prow portion, said mold board having its outer end partially closed and means for increasing the discharge opening at the outer end of said mold board.

It is more specifically an object of this invention to provide a snow plow having a laterally extending concave mold board of partially cylindrical form at its outer end, having a portion cut away at its upper side, together with an upwardly extending opensided discharge chute having its lower end embracing the opening formed by said cut away portion of said mold board, said plow having rotary discharge means at the outer end of said mold board for discharging the snow through said chute.

It is still another object of this invention to provide a snow plow as set forth in the preceding paragraph, together with an adjustable curved deflecting member at the top of said chute for directing the snow laterally.

These and other objects and advantages of the invention will be fully set forth in the following description made in connection with the accompanying drawings, in which like reference characters refer to similar parts throughout the several views, and in which:—

Figures 1, 8:
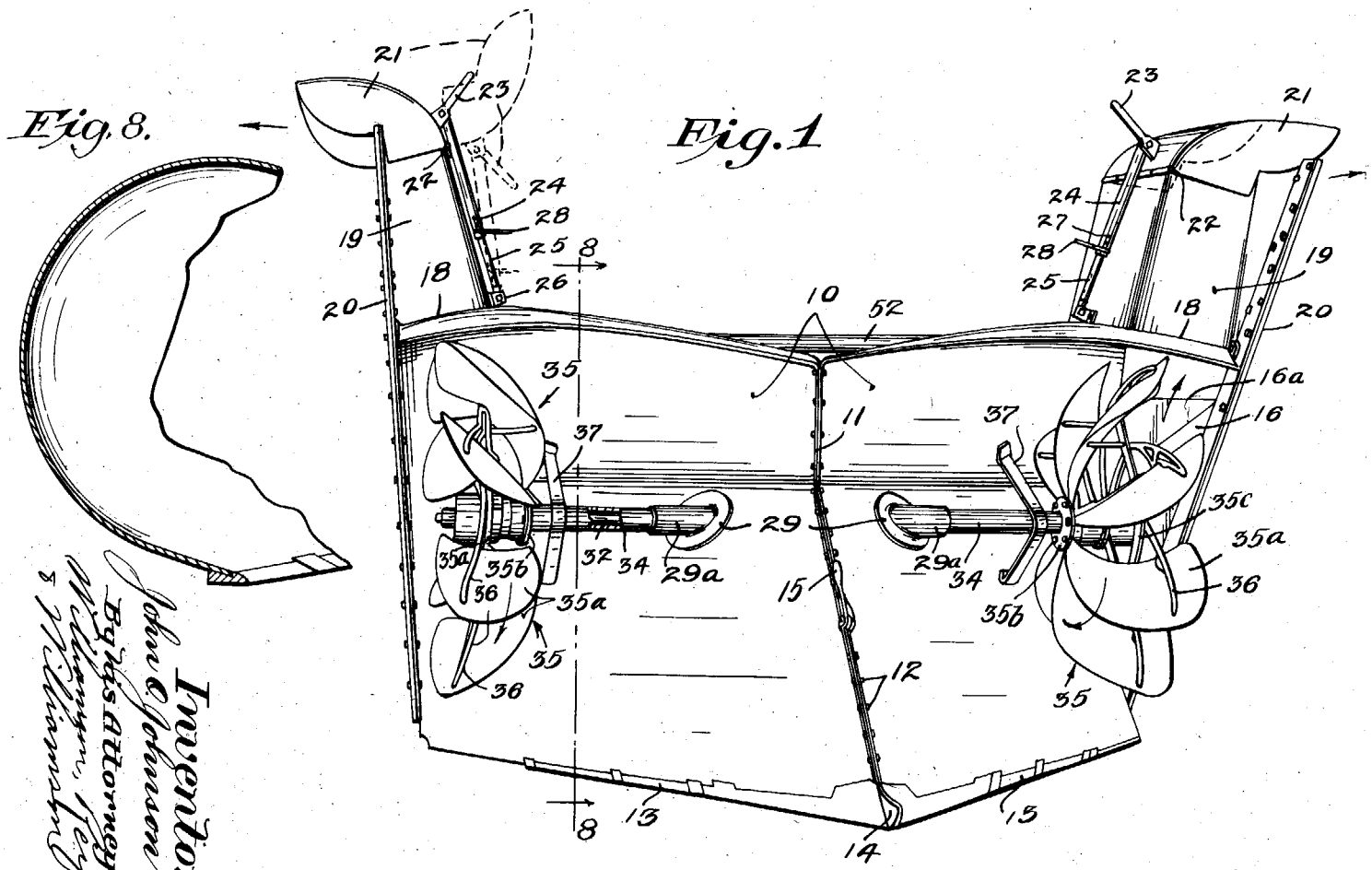
Fig. 1 is a view in front elevation of the plow.
Fig. 8 is a vertical sectional view of a portion of the plow taken on the line 8—8 of Fig. 1.
Figure 2:
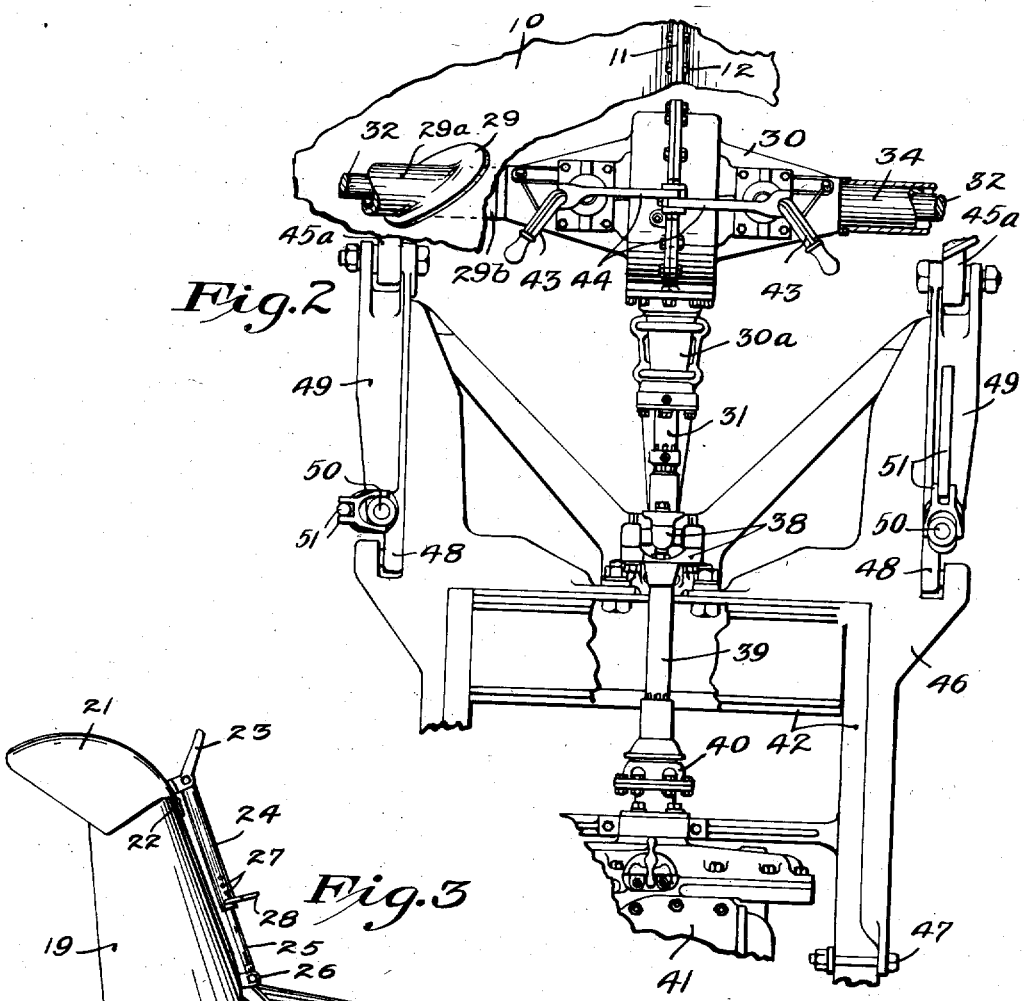
Fig. 2 is a top plan view with some parts broken away and others shown in horizontal section, together with part of the automotive vehicle which propels this plow.
Figure 3:
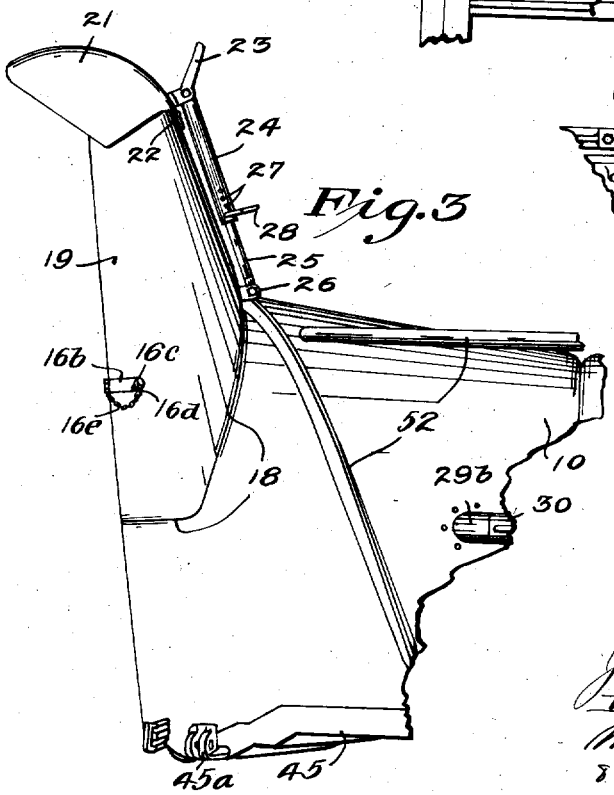
Fig. 3 is a partial view in rear elevation.
Figure 4:
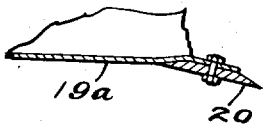
Fig. 4 is a horizontal section taken on line 4—4 of Fig. 5, as indicated by the arrow.
Figure 7:
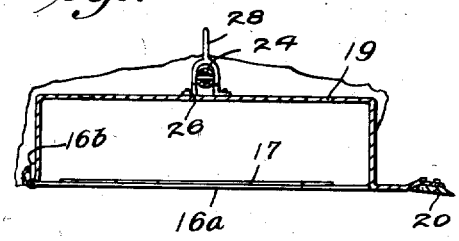
Fig. 7 is a horizontal section taken on line 7—7 of Fig. 6, as indicated by the arrow.
Figure 6:
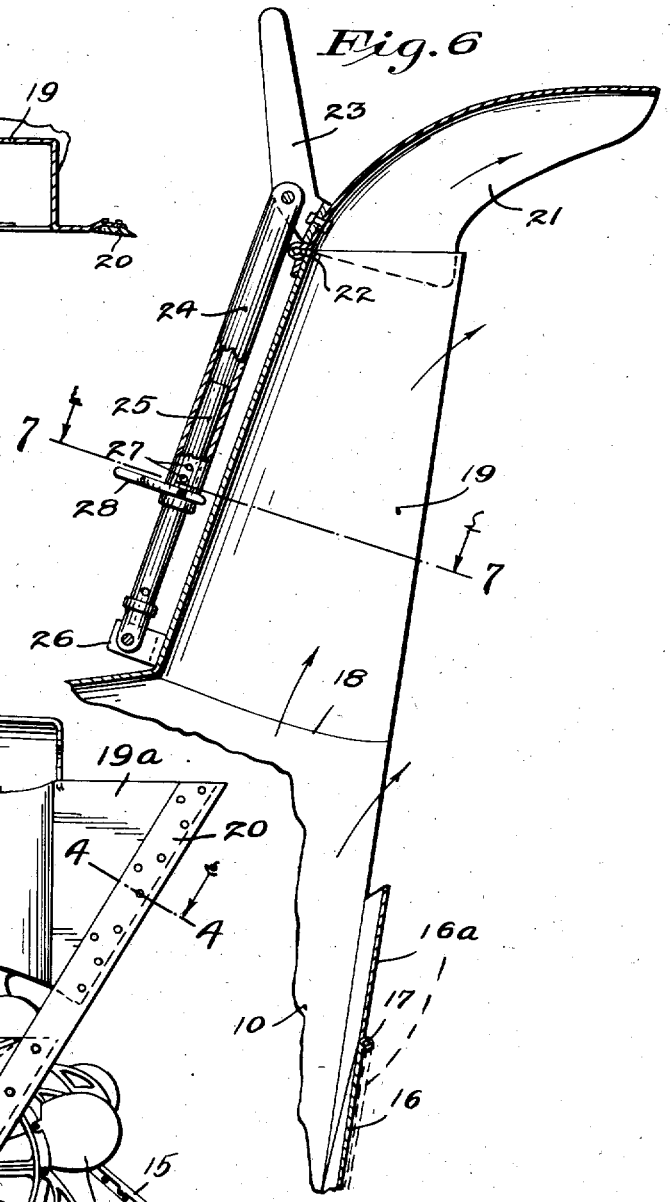
Fig. 6 is a vertical section taken on line 6—6 of Fig. 5, as indicated by the arrows.
Figure 5:
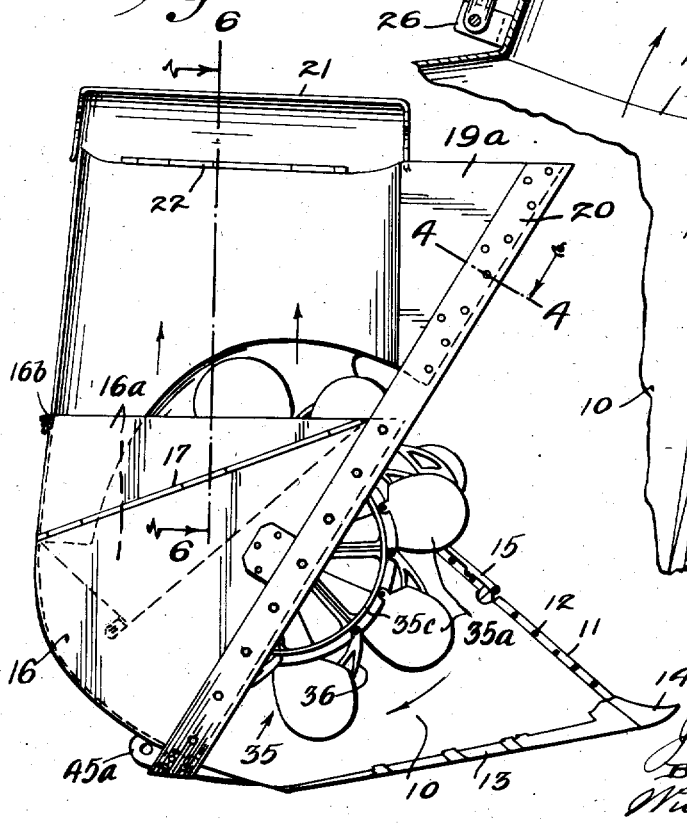
Fig. 5 is a view in side elevation of the plow.

Referring to the drawings, a plow is shown comprising rearwardly and laterally extending mold boards 10 meeting in a rearwardly and upwardly extending line 11 at their inner ends, said mold boards being shown as having forwardly extending flanges connected together by headed and nutted bolts 12. The lower edges of mold boards 10 are received in plates 13 having a forwardly extending tongue or projection 14 at the center of the plow. A handle 15 is shown at the center of the plow, as illustrated in Fig. 1, adapted to operate mechanism not shown, to lift the front of the plow. The mold boards 10 are concave and the concavity increases toward the outer end of the mold boards, which outer ends are semi-cylindrical in shape as best illustrated in Fig. 8. The outer end of each mold board is closed or partially closed by a plate 16, said plate having a triangular upper portion 16*a* hinged to the upper fixed portion of plate 16 at 17 so as to swing downwardly as indicated in dotted lines in Fig. 5. Plate 16*a* has a hasp 16*b* hinged thereto fitting over a staple 16*c* secured in the side of chute 19, a hook 16*d* being adapted to pass through said staple at the outer side of the hasp, said hook being secured to the end of a short chain 16*e* secured to the chute 19. The top portions of the mold boards 10 are cut away along the line 18 as shown in Figs. 1, 3, and 6 and a chute 19 is provided, which is open at its outer side and extends upwardly above said mold boards. The chute 19 is tapered and has its lower end connected to the mold board so as to enclose the opening made by said cut away portion, said chute having its outer side flush with the outer end of said mold board. A plate forming a cutter bar or blade 20 is disposed at the outer side of each mold board 10, said blade extending forwardly from its lower end toward its upper end and extending outwardly from the center of the plow from its lower end toward its upper end. Blade 20 is attached to plate 16 at its lower end and at its upper end is attached to an extension 19a of chute 19 as shown in Fig. 5. A deflecting member 21 is provided at the top of chute 19, the same being hinged to the rear side of said chute at 22. Member 21 has an adjusting handle 23 secured thereto which is pivotally connected to a pipe or tube 24 extending downwardly in the rear of chute 19. Pipe 24 has extending thereinto a rod 25 pivoted at its lower end to a bracket 26 secured to the rear of chute 19. Pipe 24 and rod 25 have holes 27 therein adapted to aline and receive a pin carried by swinging handle 28 secured to pipe 24 so that said pipe 24 and rod 25 may be held in various positions. Each mold board 10 has an opening therethrough adjacent its inner end and a bracket 29 is secured to each mold board having an outwardly projecting hub 29a and hub 29b, which projects through the mold board to the rear thereof. The ends of the hubs 29b are connected to the opposite ends respectively of a gear housing 30 disposed in the rear of the mold boards having a rearwardly projecting portion 30a through which extends a shaft 31. The shaft 31 is connected by bevel gears, not shown, to laterally extending shafts 32 enclosed by housings 34, said shafts and housings extending to the discharge rotors 35 disposed at the front and outer ends of the mold boards 10. Said discharge rotors comprise a plurality of curved blades 35a secured at one end to hub 35b and at their other sides to a ring 35c, said ring also supporting one end of brackets 36 which extend across and reinforce the rear sides of the blades 35a. The housings 34 are supported by brackets 37 secured to the front of the mold board. The discharge members 35 are disposed at the outer ends of the mold boards and substantially beneath the chutes 19. Each rotor 35 is thus disposed in a casing formed by the outer portion of the mold board and plate 16. The housing 30 has handles 43 fulcrumed thereon forming shift levers for moving the shafts 32 into and out of engagement with the rotors 35. Arms 44 are shown for holding the levers in one position. The shaft 31 is connected by a universal joint 38 to a shaft 39 which is in turn connected by a flexible coupling 40 to the crank shaft of the motor 41 of the propelling automobile or truck, a portion of the frame of which is shown as 42.

The mold boards 10 have a bar 45 extending along the rear side along the bottom thereof having rearwardly projecting spaced apertured lugs 45a forming means for connecting the plow to the propelling vehicle. A connecting member 46 is also used pivoted to the frame 42 by the headed and nutted bolts 47 and also pivotally connected to lugs 48 forming part of the plow. The plow or mold boards have a rearwardly projecting frame 49 comprising screws 50 used for tilting the plow, some of the operating mechanism of which is shown as 51. This mechanism forms no part of the present invention and is shown in more detail in the co-pending application of John O. Johnson, S. No. 120,603, filed on July 6th, 1926, now Patent No. 1,754,322. Certain bracing frame members 52 are also shown as extending along the rear side of the mold boards 10.

In operation the plow will be pushed forwardly from the rear by the truck on frame 42 and shaft 31 will be rotated from the shaft of the motor 41 through the shaft 39. This will, through the gears in housing 30 rotate the shafts 32 and rotors 35 will be driven. As the plow moves along the highway, snow is first encountered by the forwardly projecting prow and the snow is moved laterally and rearwardly along the mold boards to the rotors 35. The rotors are driven at high speed and the snow is engaged thereby and discharges through the openings above plates 16 and into the chutes 19. The snow is prevented from being projected outwardly by the plates 16 and the blades 35a are so formed as to tend to throw the snow tangentially upwardly substantially in alinement with chutes 19, as indicated by the arrows in Fig. 6. The snow at the outer side of each mold board is cleanly cut by the cutter bar or blade 20 and any snow inside of this cutter bar or blade is engaged by the rotor 35 and propelled upwardly and outwardly. When the plow is thus operating in a deep drift or bank, the snow will be propelled upwardly sufficiently to get up over the top of the bank and the bank will have a downward slope on account of the fact that the blade 20, the plane of the outer end of the mold board and chute 19 extends outwardly and upwardly as clearly shown in Figs. 3 and 6. If the drift or bank is not too high, the deflector 21 will be moved over the top of chute 19 as shown in Figs. 3 and 6 to throw the snow laterally. If the drift or bank is very high the deflector 21 may be swung inwardly as shown in Fig. 1 by a swinging lever 23 downwardly and telescoping tube 24 on the rod 25. With the snow thus discharged upwardly and outwardly the road will be kept clear at the bottom of the bank formed in the drift of snow and there will be no tendency for the snow to drop down to the foot of the bank and form a ridge or talus which will obstruct the road. When the plow is operating on lesser drifts of snow the plate 16a can be swung downwardly and the snow allowed to be discharged more directly outwardly. This will be done where there is plenty of opportunity to get the snow well off to the side of the road. The blade 20 acts effectively to cut through the drift to form a wall for the snow bank or drift. With plows which merely operate at the bottom of the bank and do not discharge the snow at a considerable height, the snow falls down after the plow passes as above described making an objectionable obstruction.

From the above description it is seen that applicant has provided an improved form of plow and one particularly adapted to make a clear and well-defined path through a deep bank or drift and a path which will not be obstructed by the snow caving or falling inward thereinto. The plow is comparatively simple in construction and can be very durably and ruggedly made. The same has been amply demonstrated in actual practice and found to be very successful and efficient.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. A snow plow having in combination, mold boards being forwardly and inwardly inclined and meeting in a central line, each of said mold boards forming a continuous surface of concave form, one of said mold boards having a cut away portion at its outer top edge, a conduit extending upwardly from said mold board, having an open outer side and having its lower end secured to said mold board to enclose the cut away portion, and a rotor disposed adjacent the outer edge of said mold board adapted to propel the snow upwardly and outwardly into said conduit along a tangential line.

2. A snow plow having in combination, a mold board extending laterally and rearwardly and being of partially cylindrical form at its outer end, said mold board having a cut away portion at its top, a chute disposed over said cut away portion and extending upwardly therefrom, a plate extending across the outer end of said mold board and partially closing the same, but leaving an opening between the top thereof and the top of said mold board, and a rotor disposed adjacent said chute and plate for discharging snow through said opening and chute in substantially a tangential direction.

3. The structure set forth in claim 2, said plate having a top section adapted to be swung down to increase the size of said opening.

4. The structure defined in claim 2, and a blade secured to said plate and to said chute and projecting forwardly therefrom, said plate inclining forwardy and outwardly toward its upper end.

5. A snow plow having in combination, a mold board extending laterally and rearwardly, said mold board being of semi-cylindrical form at its outer end and having a cut away portion at its top, a chute extending vertically from said cut away portion and having an open outer side, a plate closing the lower portion of said mold board at its outer end and a rotor disposed at the outer end of said mold board and rotatable about an axis parallel to the axis of concavity of said mold board, adapted to engage the snow and direct the same upwardly into said chute.

6. A snow plow having in combination, a mold board extending laterally and rearwardly having a concave surface and being partially cylindrical at its outer end, said mold board having a cut away portion at its top, a chute extending vertically from said mold board and enclosing said cut away portion at its bottom, said chute being open at its outer side, and the outer side of said chute and the mold board being in substantially the same plane and inclined slightly outwardly from the vertical.

7. A snow plow having in combination, a mold board extending laterally and rearwardly and of concave form, a rotor disposed at the outer end of said mold board, a plate closing the lower portion of the outer end of said mold board, a blade extending along the front end of said plate and upwardly and outwardly therefrom, and a conduit extending vertically from the outer end of said mold board, and into which said rotor delivers.

8. A snow plow having in combination, a laterally and rearwardly extending mold board, a plate closing the lower outer portion of said mold board, a blade at the outer end of said mold board having a forwardly directed edge, said blade inclining forwardly toward its upper end and inclining slightly outwardly toward its upper end.

9. A snow plow having in combination, a mold board extending outwardly from a central plane and having a concave curved surface, a snow-moving rotor disposed in front of and adjacent one side of said mold board and a cutter bar extending upwardly at the outer side of said mold board to a point a substantial distance above said mold board and sloping outwardly toward its upper end.

10. A snow plow having in combination, a mold board extending outwardly from a central plane, said mold board having a substantially concave surface, a snow-moving rotor in front of and adjacent the outer side of said mold board, a plate at the outer side of said rotor, a chute disposed above said rotor for receiving snow therefrom and a cutter bar extending upwardly along the front of said blade and to a point well above said rotor and at the outer side of said chute.

JOHN O. JOHNSON.